Figure 1:
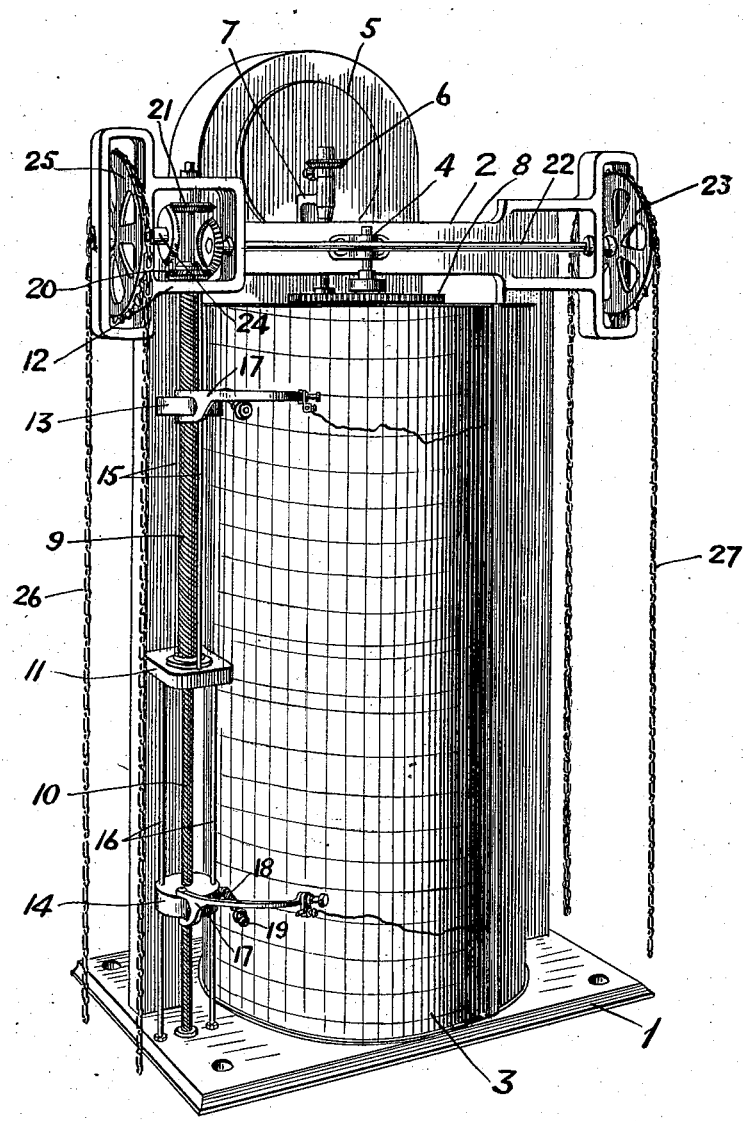

E. W. EATON.
HYDROCHRONOGRAPH.
APPLICATION FILED MAY 10, 1911.

1,014,134.

Patented Jan. 9, 1912.
2 SHEETS—SHEET 1.

WITNESSES:
Rob. R. Kitchel
Frank C. Funch

INVENTOR
Emery W. Eaton
BY
Augustus B. Stoughton.
ATTORNEY.

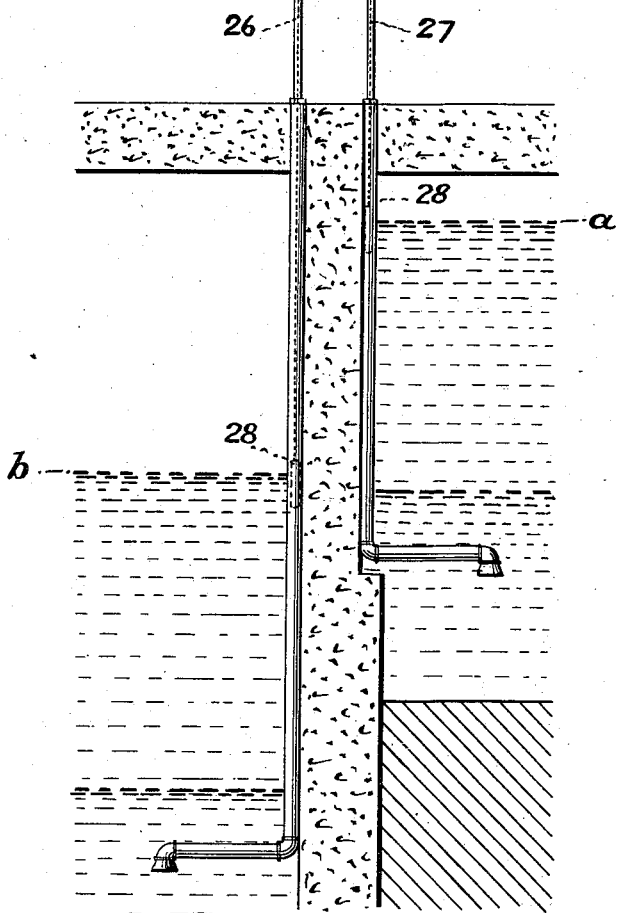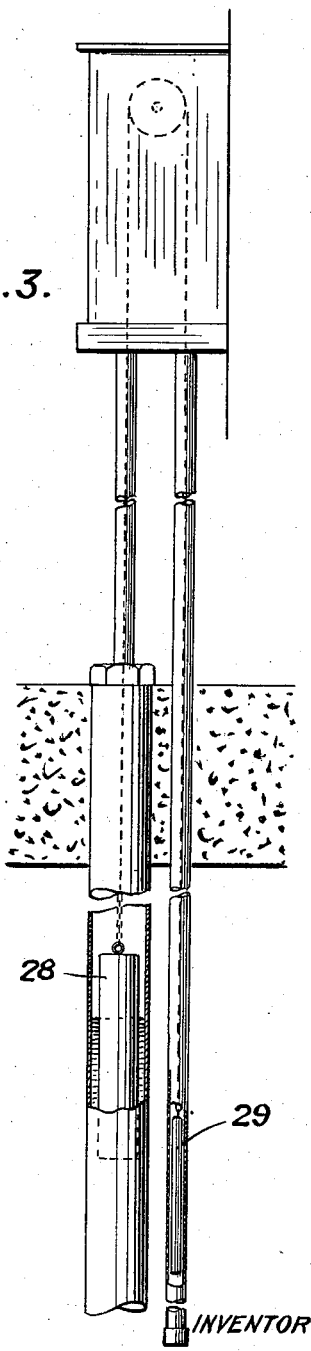

UNITED STATES PATENT OFFICE.

EMERY W. EATON, OF PHILADELPHIA, PENNSYLVANIA, ASSIGNOR TO BARRETT & LAWRENCE, INCORPORATED, OF PHILADELPHIA, PENNSYLVANIA, A CORPORATION OF PENNSYLVANIA.

HYDROCHRONOGRAPH.

1,014,134. Specification of Letters Patent. Patented Jan. 9, 1912.

Application filed May 10, 1911. Serial No. 626,358.

*To all whom it may concern:*

Be it known that I, EMERY W. EATON, a citizen of the United States, residing at the city of Philadelphia, in the county of Philadelphia and State of Pennsylvania, have invented a certain new and useful Hydrochronograph, of which the following is a specification.

The principal object of the present invention is to provide a compact, accurate and reliable instrument for recording during a period of time the effective head or, in other words, for recording the head level and the tail level at a water power plant.

The invention will be claimed at the end hereof but will be first described in connection with the embodiment of it chosen for illustration in the accompanying drawings in which—

Figure 1, is a perspective view of an instrument embodying features of the invention. Fig. 2, is a view diagrammatically illustrating the application of the instrument shown in Fig. 1, and Fig. 3 is a side view illustrating upon an enlarged scale details of arrangement.

In the drawings 1, is a base, and 2, is a yoke frame arising from the base and consisting of uprights and a cross-piece.

3, is a drum mounted vertically and arranged to revolve on a pivot at the base and in a guide 4, on the cross-piece of the yoke. The drum is therefore easily rotated and even if slightly unbalanced still rotates properly.

5, is a clock mechanism carried by the cross-piece of the yoke. The driving shaft of the clock mechanism is provided with a beveled pinion which drives the bevel gear 6, on a vertical shaft revoluble in a bracket 7, and on the end of this shaft there is a gear wheel which meshes with and drives a gear wheel 8, on the spindle of the drum. By reason of the described mounting of the drum in vertical position the clock mechanism is required to do comparatively little work.

9 and 10, are vertically arranged revoluble screws. As shown they are nested, that is to say, the screw 10, extends through and beyond the screw 9, which is made tubular for the purpose. The screws are supported by the base, the bracket 11, on the upright of the yoke, and the bearing 12, at the cross-piece of the yoke.

13 and 14, are nuts engaging the screws 9 and 10, respectively. These nuts are held against rotation by guides 15 and 16, so that when the screws turn, which they may do independently, the nuts travel up and down. Since the weight of the nuts and the parts which they carry always acts downward, the nuts are accurately positioned. Each nut has pivoted to it a stylus arm 17, adapted to mark paper applied to the drum. Between each stylus arm and its nut is a spring 18, connected with an adjusting screw 19, the shank of which works through an eye or opening in the arm, thus the pressure of the stylus arms on the paper can be adjusted. At their upper ends the screws 9 and 10, are respectively provided with bevel wheels 20 and 21. The shaft 22, carries at one end a bevel wheel which meshes with the bevel wheel 20, and at the other end a sprocket wheel 23. The shaft 24, carries at one end a bevel wheel which meshes with the bevel wheel 21, and is provided at the other end with a sprocket wheel 25.

26 and 27, are sprocket chains provided at one of their ends with a float 28, and at the other of their ends with a weight 29, Fig. 3. The float and weight are shown as arranged in suitable tubes and in Figs. 2 and 3, the instrument is shown as inclosed in a housing. Referring to Fig. 2, one of the floats 28, is arranged to rise and fall with the head level $a$, and the other float is arranged to rise and fall with the tail level $b$, thus the float which drives the screw 9, in rising and falling causes the upper stylus to indicate or mark the head level on the paper of the rotating drum, and the float which drives the screw 10, causes the lower stylus to indicate the tail level on the paper of the drum, and from this record the effective head is recorded continuously, it being understood that the difference between the head level $a$, and the tail level $b$, is the effective or available head. The operative ends of the arms are in alinement axially of the drum so that the record made by each arm represents the conditions that control both arms at the same time.

Evidently the invention is not limited in respect to the details herein set forth and it can be used otherwise than as herein described without departing from the spirit of the invention.

What I claim is:

1. A hydro-chronograph for recording difference in level or head which comprises a clock driven drum, nested revoluble screws, stylus arms spaced apart and operated respectively by said screws and both adapted to simultaneously coöperate with the drum, and float mechanisms for independently operating the screws, substantially as described.

2. A hydro-chronograph for recording difference in level or head which comprises a clock driven drum, nested screws provided respectively with driven toothed wheels and whereof one projects through and beyond the other, stylus arms spaced apart and mounted respectively on said screws and both adapted to coöperate with the drum, and independent sets of float mechanism provided with driving toothed wheels which respectively mesh with said driven wheels, substantially as described.

3. A hydro-chronograph for recording difference in level or head which comprises a base, a yoke rising therefrom, a vertical drum revolubly mounted between the yoke and base, a clock mechanism carried by the yoke, gear wheels between said mechanism and drum for revolving the latter, a pair of vertically arranged screws revolubly carried by the yoke frame, stylus arms respectively engaging the screws, guides for said arms, a driven wheel on each screw, and shafts carried by the yoke frame and provided with float driven wheels and with driving wheels respectively meshing with the driven wheels on the screws, substantially as described.

4. In combination independent floats one for head level and one for tail level, a clock driven paper carrying drum, stylus arms spaced apart and having their operative ends arranged in alinement axially of the drum, and screws, one for each stylus arm, and whereof one is operated by one float and the other by the other float, whereby a contemporaneous record of each level is made.

5. In an instrument of the type specified the combination of a clock driven drum, a pair of screws, and a pair of stylus arms mounted on the screws and having their operative ends arranged in the same axial line on the drum whereby two records are contemporaneously made.

In testimony whereof I have hereunto signed my name.

EMERY W. EATON.

Witnesses:
CLIFFORD K. CASSEL,
K. M. GILLIGAN.

Copies of this patent may be obtained for five cents each, by addressing the "Commissioner of Patents, Washington, D. C."